United States Patent [19]
Keen et al.

[11] 4,089,300
[45] May 16, 1978

[54] AUGER ASSEMBLY FOR USE IN FEED DISPENSING HOPPERS

[75] Inventors: Everett M. Keen; Anthony J. Siciliano, both of Vineland, N.J.

[73] Assignee: Diamond International Corporation, New York, N.Y.

[21] Appl. No.: 777,743

[22] Filed: Mar. 14, 1977

Related U.S. Application Data

[63] Continuation of Ser. No. 629,661, Nov. 6, 1975, abandoned.

[51] Int. Cl.² ............................................. A01K 5/02
[52] U.S. Cl. ............................... 119/52 AF; 198/662; 198/669
[58] Field of Search .................. 119/51.11, 52 AF, 53, 119/56 R, 18; 222/412, 272, 273, 236, 240, 241; 239/218.5, 664, 669, 675; 214/83.32; 198/663, 669, 657, 662, 570

[56] References Cited

U.S. PATENT DOCUMENTS

| | | | |
|---|---|---|---|
| 2,657,831 | 11/1953 | Pierce | 222/272 |
| 2,960,320 | 11/1960 | Heider | 214/83.32 X |
| 3,263,801 | 8/1966 | Dudte | 119/52 AF |
| 3,273,539 | 9/1966 | Cooper | 119/52 B |
| 3,430,822 | 4/1969 | Lienemann et al. | 222/412 |

Primary Examiner—Hugh R. Chamblee
Attorney, Agent, or Firm—Karl W. Flocks

[57] ABSTRACT

Auger assembly for use in feed dispensing hoppers comprising in combination an elongate housing member with feed dispensing openings on the underside thereof, web portions extending above the dispensing openings, feed admitting cutouts longitudinally spaced from the openings and on the upper side of the housing member; at least one drive shaft disposed in the housing member and extending the full length thereof; a multi-sectional auger device having a bore disposed around the drive shaft and secured thereto for rotation therewith. Each section of the auger device is adapted to convey feed into the space under a web portion of the housing member and dispense feed out through a dispensing opening.

1 Claim, 9 Drawing Figures

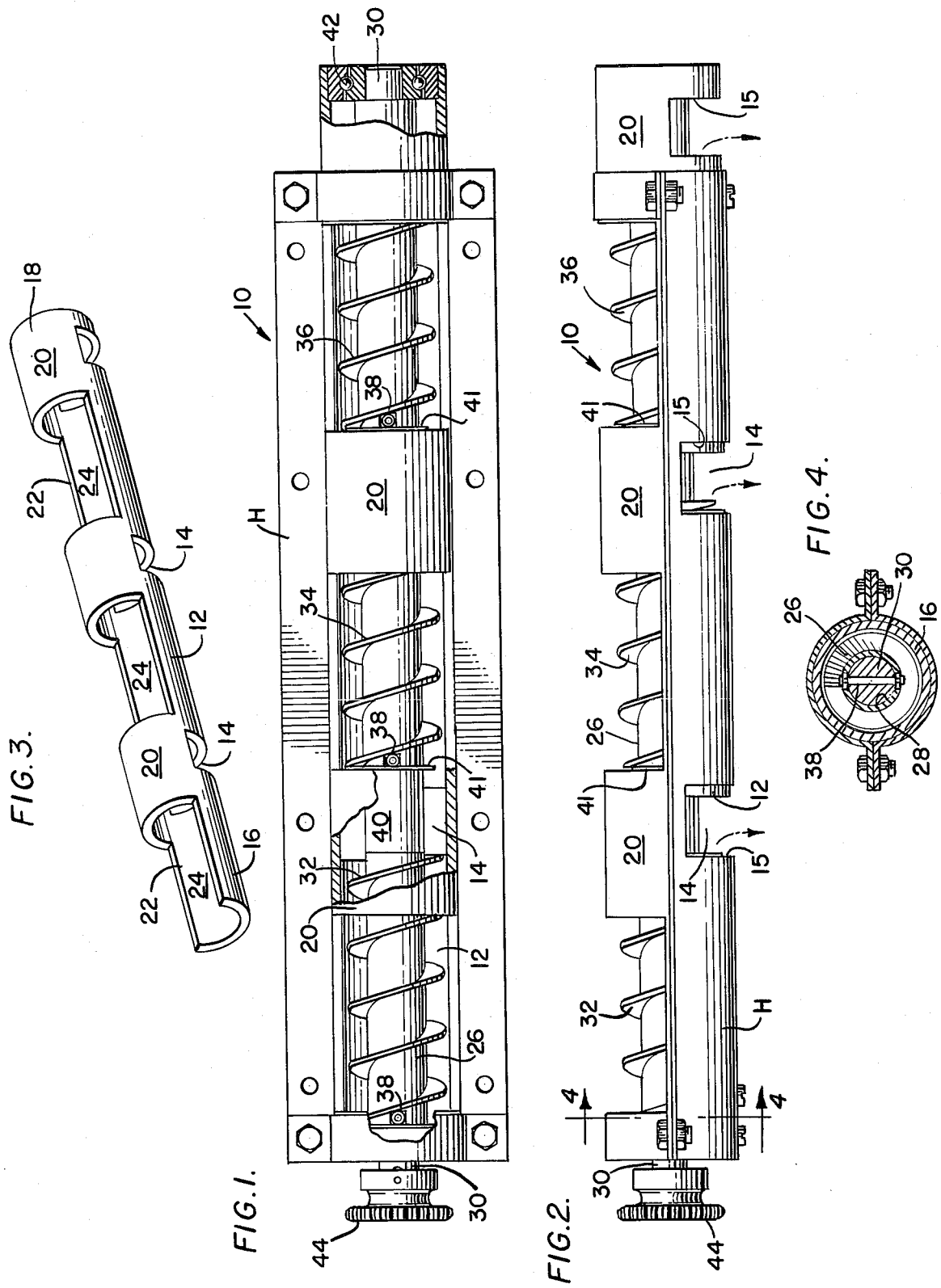

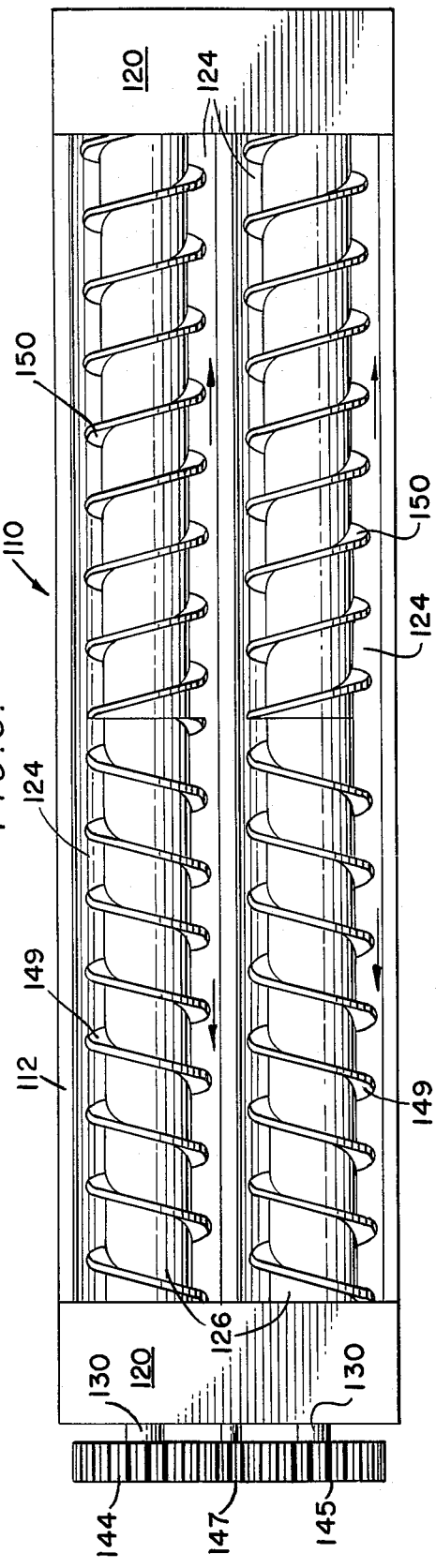
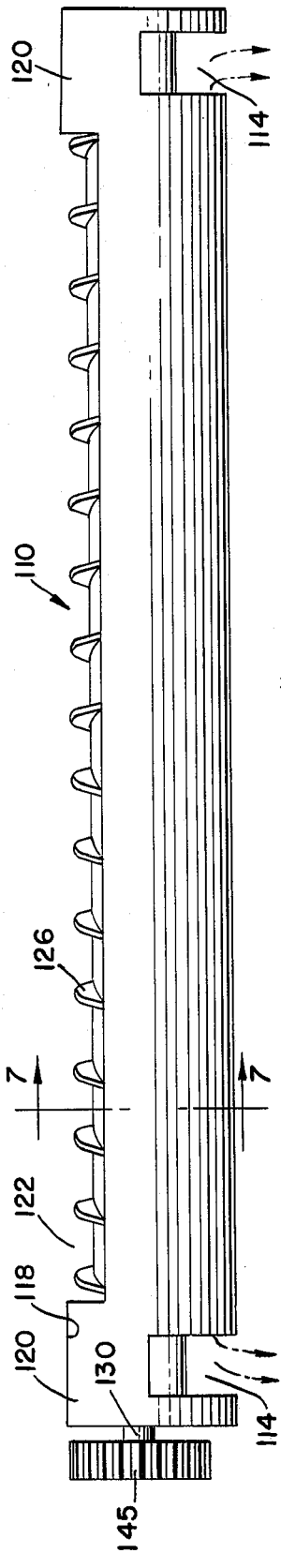
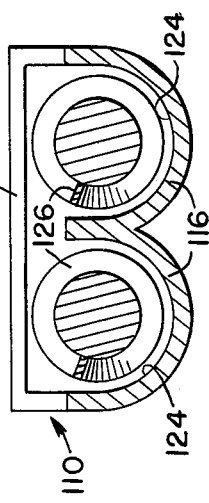

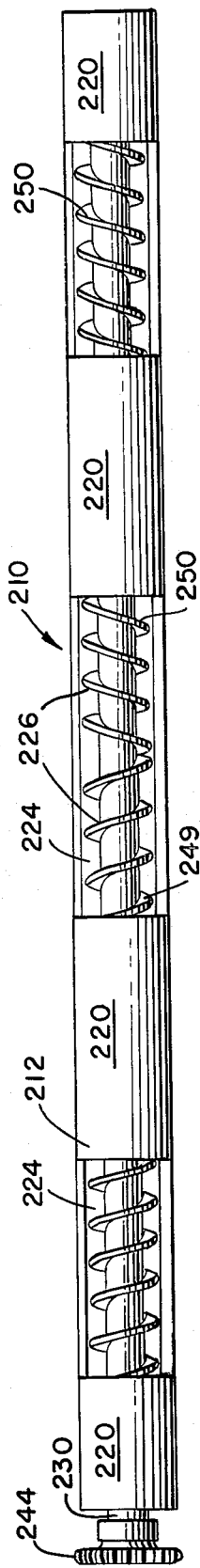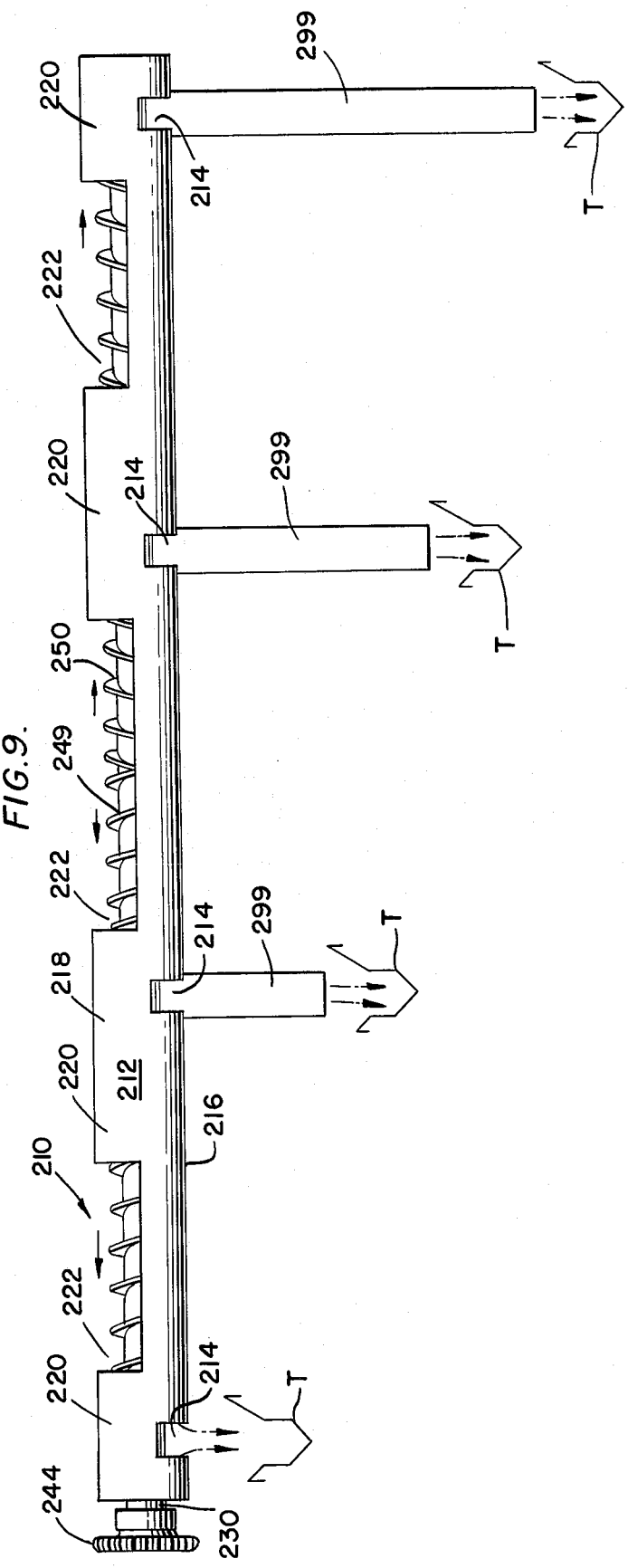
FIG.8.
FIG.9.

AUGER ASSEMBLY FOR USE IN FEED DISPENSING HOPPERS

This is a continuation, of application Ser. No. 629,661, filed Nov. 6, 1975, now abandoned.

BACKGROUND OF THE INVENTION

1. Field of the Invention

The present invention relates to auger devices for use in feed dispensing hoppers of the type adapted to feed animals, such as poultry confined in cages or the like.

2. Description of the Prior Art

One prior art example of devices of the general class to which the present invention belongs is represented by U.S. Pat. No. 3,339,530 [Gillette]. In the Gillette construction an auger device is provided in combination with a feed hopper for conveying feed from a stationary hopper along the length of an auger housing having an elongate feed slot along one side thereof and through which feed may be dispensed.

In the feeding of poultry, which are confined in battery cage arrangements frequently extending for very substantial distances, use of the Gillette system would require very large conveying augers in terms of length, so large in fact that considerable initial expense would be required in the construction thereof. Further, great power requirements would then also be necessary for the operation of such a system as disclosed by Gillette.

SUMMARY OF THE INVENTION

The present invention relates to an improved auger assembly for use in feed dispensing hoppers.

It is an object of the present invention to provide an improved auger assembly for dispensing feed through the bottom or lower portion of a hopper.

It is also an object of this invention to provide an improved auger assembly including a housing member for holding the bulk of the weight of feed contained in a hopper off of an auger disposed at the bottom of the hopper.

It is further an object of this invention to provide an improved auger assembly including means through which feed may be conveyed at a uniform rate and dispensed from a hopper at a uniform rate.

It is moreover an object of the present invention to provide an improved auger assembly for dispensing feed through openings formed in lowering portions of a hopper with portions of the assembly shielding the openings to prevent feed from passing therethrough solely under the force of gravity.

It is yet another object of this invention to provide an improved auger assembly for dispensing feed from a hopper through a plurality of separate and distinct openings spaced apart from each other.

It is still another object of the present invention to provide an improved auger assembly for dispensing feed from a hopper at a uniform rate through a plurality of separate and distinct openings.

BRIEF DESCRIPTION OF THE DRAWINGS

FIG. 1 shows a plan view of an auger assembly according to the present invention with portions thereof broken away for clarity;

FIG. 2 is a side elevational view of the auger assembly of FIG. 1;

FIG. 3 is a view in perspective of a housing member of the auger assembly of FIGS. 1 and 2;

FIG. 4 is a view taken along the section 4—4 in FIG. 2 and looking in the direction of the arrows;

FIG. 5 is a plan view of an alternative embodiment of the auger assembly according to the present invention;

FIG. 6 is a side elevational view of the auger assembly illustrated in FIG. 5;

FIG. 7 is a view taken along the section 7—7 in FIG. 6 and looking in the direction of the arrows;

FIG. 8 is a plan view of another alternative embodiment of the auger assembly according to the present invention; and FIG. 9 is a side elevational view of the auger assembly illustrated in FIG. 8.

DETAILED DESCRIPTION OF THE INVENTION

Referring now in detail to the drawings, and in particular to FIGS. 1-4, the reader will readily appreciate the present invention as embodied in an improved auger assembly 10 suitable for use in dispensing feed or other particulate materials from a hopper. The auger assembly 10 is readily adaptable for incorporation into the lower portion of a hopper H of the type having downwardly converging wall portions for funneling feed to the auger assembly 10. The auger assembly 10 comprises a housing member 12, which may take the general shape of a cylindrical tube. Housing 12, as clearly seen in FIG. 3, comprises a plurality of separate and distinct feed dispensing openings 14, each of which is spaced apart from each other along the underside 16 thereof and in registration with openings 15 in the lower portion of hopper H. Along the upper side 18 of housing 12 is a plurality of web portions 20 extending over openings 14. On one side of each of the web portions 20 of housing 12 and out of vertical alignment from openings 14, a plurality of cutout or feed admitting portions 22 are provided to expose feed receiving bed portions 24.

In addition to housing 12, auger assembly 10 comprises auger unit 26 mounted for rotation within housing 12 in the space between underside 16 and upper side 18. Auger unit 26 is formed with a bore 28 therethrough which receives a drive shaft 30 to which it is secured for rotation therewith. For convenience, auger unit 26 may be formed in multiple sections 32,34,36 each of which is secured to shaft 30, for example, by a pin 38. Between adjacent ends of auger sections a spacer sleeve 40 may be interposed such as between adjacent ends of auger sections 32 and 34. To effect separate feed conveying chambers between auger sections 32 and 34 and between auger sections 34 and 36, a partition plate 41 is disposed at one end of each spacer sleeve 40. Shaft 30 is supported for rotation at opposite ends thereof in bearing units 42, for example, and may be driven at one end through a gear or sprocket 44 or the like.

An alternative embodiment of the present invention is illustrated in FIGS. 5-7 in the form of an auger assembly 110 comprising a "twin-bed" housing 112 with feed admitting bed portions 124. Each bed portion 124 has a plurality of separate and distinct feed dispensing openings 114, each of which is spaced apart from each other along the underside 116 thereof. Along an upper side 118 of housing 112 a plurality of web portions 120 are provided which extend over openings 114. On one side of each of the web portions 120 of housing 112 and out of vertical alignment from openings 114 a cutout or feed admitting portion 122 is provided to expose feed receiving bed portions 124.

Auger assembly 110 further includes twin-auger units 126, each of which is mounted for rotation in the space between underside 116 and upper side 118. Each auger unit 126 is secured to a drive shaft 130 for rotation therewith by gears 144,145 having an idler pinion 147 drivingly connected therebetween. Each auger unit 126 as seen in FIG. 5 comprises multiple sections 149,150 having opposite hand screws.

A further alternative embodiment of the present invention is illustrated in FIGS. 8 and 9 in which auger assembly 210 comprises a housing 212 formed with spaced-apart dispensing openings 214 on the underside 216 thereof. Along upper side 218 of housing 212 a plurality of web portions 220 are provided which extend over openings 214. On one side of each of the web portions 220 of housing 212 and out of vertical alignment from openings 214 cutout or feed admitting portions 222 are formed to expose feed receiving bed portions 224.

Auger assembly 210 further comprises an auger unit 226 which includes a plurality of tandem or in-line sections 249,251 secured to a drive shaft 230 for rotation therewith by gear 244. Auger sections 249 and 250 have opposite hand screws.

Feed discharged from auger assembly 210 is dispensed into a plurality of separate troughs T, which as illustrated in FIG. 9 are at different elevational levels. To ensure that feed is not spilled or dispensed out of the confines of the troughs T, discharge tubes 299 may be attached to the openings 214. Tubes 299 are of such length as to extend down toward, but free of troughs To so as to avoid interference therefrom.

OPERATION OF THE INVENTION

From the above description of the present invention including alternative embodiments thereof, it is believed that the reader will readily appreciate that feed in the auger assembly is conveyed toward the dispensing openings in the direction of the arrows appearing for example in FIGS. 5 and 9 and dispensed down through openings as indicated by arrows in FIGS. 2, 6 and 9. The auger assembly of the present invention is provided for use with traveling dispensing hoppers and may be driven as the hopper moves in one direction to dispense feed therefrom and deactivated as the hopper returns to the starting point.

With the above in mind and reference to the embodiment of FIGS. 1-4, it is seen that with auger assembly 10 incorporated into the lower portion of a hopper H feed will gravitate toward auger assembly 10 particularly where hopper H is of the type having downwardly converging walls which will have a funnel effect. In the normal course of gravitation of feed toward auger assembly 10, it will enter housing 12 through cutouts or feed admitting portions 22 and deposit in feed receiving bed portions 24. Web portions 20 will prevent feed from gravitating past spacer sleeves 40 and through openings 14. As auger unit 26 is turned by shaft 30 and gear 44, feed will be conveyed to the right by auger sections 32, 34, 36 as seen in FIGS. 1 and 2 until it is dispensed out through openings 14. With auger assembly 10 constructed in the manner described above, a very uniform rate of feed dispensing may be effected.

In the operation of the alternative auger assembly 110 of the present invention as illustrated in FIGS. 5-7, the shafts 130 are rotated in the same direction in that gears 144,145 are in driving relationship with a common idler pinion 147. As twin auger units 126 are turned by shafts 130 feed deposited in feed receiving bed portions 124 is conveyed in the direction of the arrows in FIG. 5 toward openings 114 and dispensed therethrough. As each auger unit 126 comprises multiple sections 149,150 having opposite hand screws, feed is conveyed toward opposite ends of the assembly 110 and dispensed thereby.

In the operation of alternative auger assembly 210, which comprises a plurality of tandem or in-line auger sections 249,250 having opposite hand screws, feed is admitted into exposed feed receiving bed portions through feed admitting portions 222 on the upper side 218 of housing 212. As seen in FIG. 9, feed is conveyed toward dispensing openings 214 at opposite ends of housing 212 by auger sections 249 and 250, which are of opposite hand, as shaft 230 is rotated by gear 244. As seen in FIGS. 8 and 9 from the central cutout portion 222, auger unit 226 includes adjacent portions of auger sections 249 and 250 so that feed admitted through the central feed admitting portion 222 will be conveyed in opposite directions in contrast to feed admitted through the cutout portions 222 on opposite ends of auger assembly 210. As seen in FIG. 9, feed can be discharged from openings 214 directly into a trough T or can be discharged from openings 214 and through extension tubes 299 into troughs T spaced a substantial distance from openings 214.

It will be obvious to those skilled in the art that various changes may be made without departing from the spirit of the invention and the invention is not to be considered limited to what is shown in the drawings and described in the specification.

What is claimed is:

1. An auger assembly for use in feed dispensing hoppers to dispense feed into a plurality of feed troughs each of which are spaced a substantial distance away from each other, comprising in combination an elongate housing having a plurality of feed dispensing openings adjacent to an underside thereof, tubular extension means attached to at least one of said openings through which feed may be dispensed into a feed trough spaced apart vertically from a feed trough to receive feed from others of said openings, web portions extending above each of said dispensing openings to prevent feed from gravitating directly through said dispensing openings, and a feed admitting cutout portion longitudinally spaced from each of said dispensing openings and on the upper side of said housing, feed conveying means disposed in said housing between said upper side and said underside for conveying feed admitted into said housing through said cutout portion toward each of said dispensing openings to effect dispensing therethrough and into different feed troughs spaced apart from each other, said conveying means including a plurality of individual auger sections, said housing also comprising a twin-bed portion and said conveying means comprising twin-auger units, some of said auger sections forming a first unit of said twin-auger units, and others of said auger sections forming a second unit of said twin-auger units, auger sections of each of said first and second auger units being arranged in in-line relationship along respective halves of said twin-bed portion, each half of said twin-bed portion including a plurality of separate and distinct ones of said feed dispensing openings whereby feed may be dispensed from said auger housing at different locations along the length thereof and at opposite sides thereof, adjacent ones of said auger sections in each of said units in addition to being in in-line relationship with each other also having screws of opposite hand for conveying feed in opposite directions and toward dispensing openings at opposite or remote ends thereof, the various auger sections of said first and second auger units having bores through which first and second drive shafts extend and being secured respectively thereto, and separate gears are attached to one end of each of said drive shafts and are in driving engagement with a common idler pinion whereby said drive shafts may be driving in the same direction at all times.

* * * * *